Dec. 29, 1959 W. F. MEYERS 2,918,832
AUTOMOTIVE DEVICE
Filed Nov. 19, 1956 6 Sheets-Sheet 1 fig. 1

INVENTOR.
WILLARD F. MEYERS
BY
Woodhams Blanchard and Flynn
ATTORNEYS

Dec. 29, 1959 W. F. MEYERS 2,918,832
AUTOMOTIVE DEVICE
Filed Nov. 19, 1956 6 Sheets-Sheet 2 fig. 2

INVENTOR.
WILLARD F. MEYERS
BY
Woodhams Blanchard & Flynn
ATTORNEYS fig. 4 fig. 3

Dec. 29, 1959  W. F. MEYERS  2,918,832
AUTOMOTIVE DEVICE
Filed Nov. 19, 1956  6 Sheets-Sheet 4 fig. 5 fig. 9

INVENTOR.
WILLARD F. MEYERS
BY
Woodhams Blanchard & Flynn
ATTORNEYS

Dec. 29, 1959     W. F. MEYERS     2,918,832
AUTOMOTIVE DEVICE Filed Nov. 19, 1956     6 Sheets-Sheet 5 fig. 6 fig. 8

INVENTOR.
WILLARD F. MEYERS
BY
Woodhams, Blanchard and Flynn
ATTORNEYS

Dec. 29, 1959 W. F. MEYERS 2,918,832
AUTOMOTIVE DEVICE
Filed Nov. 19, 1956 6 Sheets-Sheet 6 fig. 7 fig. 10

INVENTOR.
WILLARD F. MEYERS
BY
Woodhams Blanchard & Flynn
ATTORNEYS

United States Patent Office 2,918,832
Patented Dec. 29, 1959

2,918,832

AUTOMOTIVE DEVICE

Willard F. Meyers, Kalamazoo, Mich., assignor, by mesne assignments, to Fuller Manufacturing Company, a corporation of Delaware Application November 19, 1956, Serial No. 622,860

10 Claims. (Cl. 74—785)

This invention relates to a variable speed transmission of the planetary type and it relates particularly to clutch structure, and means for actuating said clutch structure, whereby the parts of the transmission may be caused to operate with respect to each other in a desired manner.

It has long been conventional in the use of planetary gear systems to have various kinds of clutching devices provided between the respectively rotatable and non-rotatable, or differentially rotatable, parts of a planetary system in order to control the relative rotation of such parts with respect to each other and also to provide power or manually (including pedally) operated means for actuating said clutches. These clutch structures have conventionally included various types of cones, disk and band clutches, as well as other engageable and disengageable apparatus, and many types of actuating means for said clutch structures have been previously used. However, many of the prior devices have involved relatively complicated mechanical control devices and they have particularly where a clutch structure has been placed inside of other mechanism, required clutch actuating mechanism involving both high initial expense and high maintenance costs.

More specifically, an externally positioned ring gear is often utilized as the means for arresting rotation of the planetary gears with respect to the carrier structure upon which said planetary gears are mounted, in order to effect direct drive. Said ring gear usually occupies at least some of the space radially outwardly of the clutch by which said ring gear is controlled. Because of this relative positioning of the ring gear and its clutch, it is necessary, in providing actuating means for said clutch to provide means which can extend radially inwardly past the ring gear to reach the clutch. Sometimes the actuation is done hydraulically, but this requires the use of rotatable hydraulic seals which are expensive to install and often require considerable maintenance to keep in operating condition. Other times this actuation is done mechanically but this requires some one of various types of rotating and sliding mechanisms which even under the best conditions of lubrication have high frictional and consequent wear characteristics and therefore create severe maintenance problems.

Further, many previously known devices have required separate actuating mechanism for each clutch utilized in the planetary system and this further complicates the apparatus and increases the expense of both its initial manufacture and subsequent maintenance.

Still further, it is desired to have a clutch actuating device which is constructed in such a manner that its inherent and essential operation during any given change from one ratio to another will effect a partial engagement of the clutch next to be engaged slightly before the previously engaged clutch is released. In this manner, there can be no interval of time between the disengagment of the previously engaged clutch and engagement of the next-to-be-engaged clutch with a consequent possible loss of power transmitted through the transmission and resultant jerkiness of operation. This is especially important in such operations as with heavy trucks, earth moving equipment or with mine shaft hoists, namely, where the speeds are relatively low and the torque loadings are extremely high, so that even a momentary interruptions of the flow of power through the system can result in a serious loss of speed of the load being driven.

It has, therefore, long been desirable to provide control mechanism for a planetary gear system in which a single source of power located radially outwardly of most, or all, of the other operating parts of the transmission can be connected and applied to both a clutch and a brake within the planetary system for operating same as desired, and to provide such mechanism which will be sufficiently simple that it will be both inexpensive to manufacture originally and will require relatively little maintenance.

Accordingly, the objects of the invention are:

(1) To provide a simple and effective ratio controlling mechanism for a planetary gear system.

(2) To provide such a mechanism in which a single source of externally applied power can be utilized to operate at least a clutch and a brake.

(3) To provide a mechanism, as aforesaid, in which no constantly running seals or constantly sliding, rotating or other frictionally contacting surfaces are required.

(4) To provide a mechanism, as aforesaid, in which the structure involved is relatively simple and can therefore be made at a low initial cost and operated with low maintenance costs.

(5) To provide a mechanism, as aforesaid, in which the inherent structure of the device requires, regardless of the specific adjustment of any of its parts, that either the clutch or brake next to be engaged in a ratio changing operation will become at least partially engaged before the previously engaged clutch or brake is released, whereby the transition from one gear ratio to another gear ratio can be made smoothly and without any momentary interruption of power.

(6) To provide a device, as aforesaid, in which the shifting from one gear ratio to another gear ratio can be effected extremely rapidly.

(7) To provide a device, as aforesaid, in which the shifting can be accomplished conveniently and reliably by fluid pressure, such as compressed air.

(8) To provide a device, as aforesaid, which will be "fail-safe" in that failure of said fluid pressure will permit springs to effect engagement of the transmission in a predetermined ratio relationship.

Other objects and purposes of the invention will be apparent to persons acquainted with devices of this general type upon a reading of the following disclosure and inspection of the accompanying drawings.

General description

In general, the apparatus of the invention is provided for use with a mechanism providing two of the speed ratios of an otherwise conventional planetary gear system. For purposes of illustration, the invention is disclosed as applied to a single, two speed planetary transmission, which may be used independently or in conjunction with other transmissions, but it will be understood that the invention may also be applied between any two speeds of a more complex planetary system.

In the invention, there is provided a clutch and a brake, both of which are here illustrated as being of the plate type, together with actuating means for said clutch and brake, one of which is energized by resilient means and the other of which is energized by means responsive to an externally applied force, such as a pressure fluid. The clutch is located between (a) the arresting means, here an externally arranged ring gear, which controls the rotation of the planetary gears with respect to the carrier upon which said gears are mounted, and (b) the shaft connected to the sun gear whereby the arresting means may be caused to rotate with said shaft. The brake is located between said arresting means and the frame of the apparatus, whereby said arresting means may be held against rotation. Said resilient means is located in a self-contained and floating unit which provides a closed force system whereby said resilient means will normally hold one of said clutch and said brake in a predetermined, here engaged, condition. The external force applying means, here pressure fluid responsive means, is provided for moving said floating unit bodily into engagement with the other of said clutch and said brake for moving it from its normal, here disengaged, condition into its non-normal, here engaged, condition. Depending upon the specific arrangement of the parts, the pressure so applied may, in a preferred form of the device, be transmitted through the resilient means in such a manner as to partially engage said brake before said clutch is entirely released or vice versa. Thus, for an instant in the shifting operation, the clutch and the brake in said preferred embodiment are endeavoring to operate at the same time so that the transition from one condition to the other condition of the gears will be immediate and without interruption in the supply of torque to the load. This function is inherent in the structure of this form of the device and does not require or depend upon the adjustment of any parts, such as the sequential operation of successive pressure cylinders.

In the other disclosed form of the apparatus, the applied force first overcomes the resilient means, whereby one of the clutch and the brake is released, and then causes a part of the floating unit to move into engagement with the other of the clutch and the brake and effects engagement thereof. This has the advantage of reducing slightly the wear upon the frictional surfaces of the clutch parts but loses some of the advantages of the preferred form, particularly the smoothness of the shift obtained thereby.

As above indicated, the apparatus is, in both of the herein illustrated embodiments, arranged so that the clutch is normally engaged and the brake is normally disengaged and for convenience in illustration the following description will refer in detail thereto. However, it will be appreciated that the principles of the invention may be readily applied to the reverse situation, namely, wherein said resilient means and the external force applying means are sensed so that the brake is normally engaged and the clutch is normally disengaged and the invention, excepting as specifically limited otherwise by the following claims, will be so understood.

Detailed construction

Figure 2:
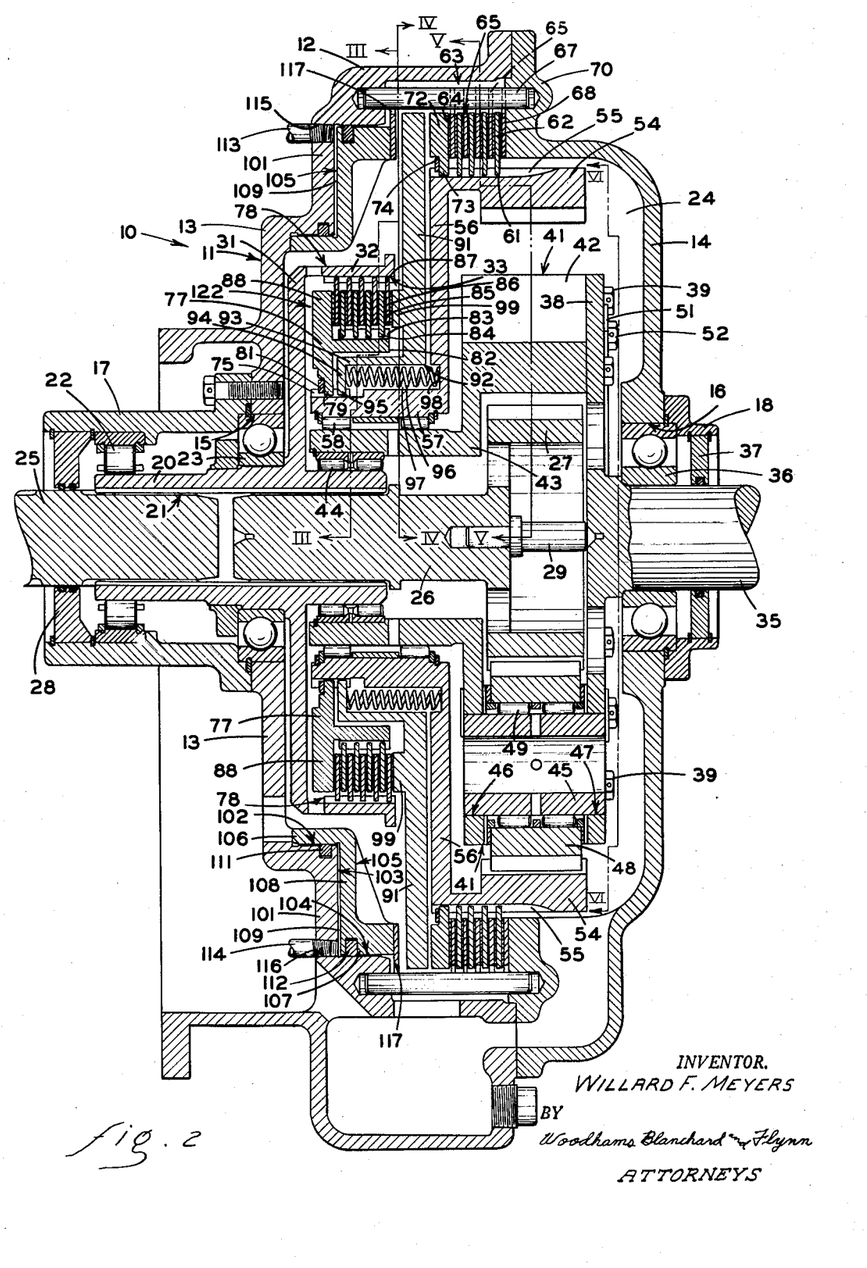
Figure 2 is a sectional view substantially as taken along the line II—II of Figure 1.

For the purpose of convenience in description, the terms "input" or "left" and "output" or "right," and derivatives thereof, will have reference to the left and right ends, respectively, of the transmission in its normal position of operation and as appearing in Figure 2. The terms "inner," "outer," and derivatives thereof, will have reference to the geometric center of said transmission and parts associated therewith.

Figure 1:
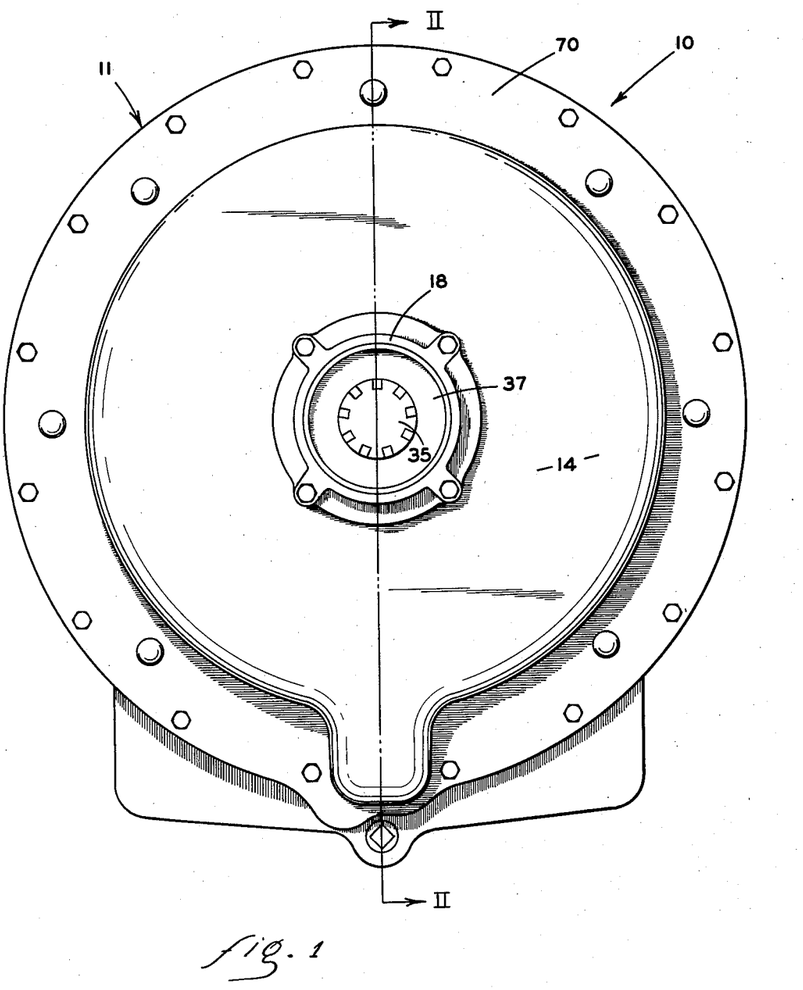
Figure 1 is an end elevational view of a variable speed transmission characterizing the invention.

As shown in Figures 1 and 2, the variable speed transmission 10 has a casing or frame structure 11, which is substantially cylindrical in shape, having a peripheral wall 12, an input end wall 13 and an output end wall 14. The end walls 13 and 14 are provided with substantially concentric and co-axial shaft openings 15 and 16, respectively. A cylindrical shaft housing 17 is mounted upon the leftward side of the input end wall 13 so that it is adjacent to, and co-axially encircles, the shaft opening 15. A collar 18 is supported upon the rightward side of the output end wall 14 so that it is co-axial with, and adjacent to, the shaft opening 16.

A hollow shaft 20, having internal splines 21, is co-axially and rotatably supported within the cylindrical housing 17 by means of the bearings 22 and 23 so that it extends through the shaft opening 15 into the chamber 24 within the casing 11. An externally splined input shaft 25 is snugly receivable into the leftward end of the internally splined, hollow shaft 20. An externally splined shaft 26 supports the sun gear 27 upon its rightward end and is snugly received into the rightward end of said hollow shaft 20. Thus, rotation of the input shaft 25 acting through the hollow shaft 20 effects a corresponding rotation of the sun gear 27 which is disposed near the rightward end of the chamber 24. A shaft seal 28, of any conventional type, embraces the input shaft 25 within the cylindrical housing 17 and is supported thereon near the leftward end thereof. The hollow shaft 20 is supported by the bearings 22 and 23 so that it is relatively non-movable in an axial direction with respect to the casing 11. Accordingly, said sun gear 27 is also held against axial movement. However, a spacing rod 29 extends co-axially from the rightward side of the sun gear 27 for the purpose of minimizing frictional contact between said sun gear and the parts at the rightward side thereof.

Figure 7:
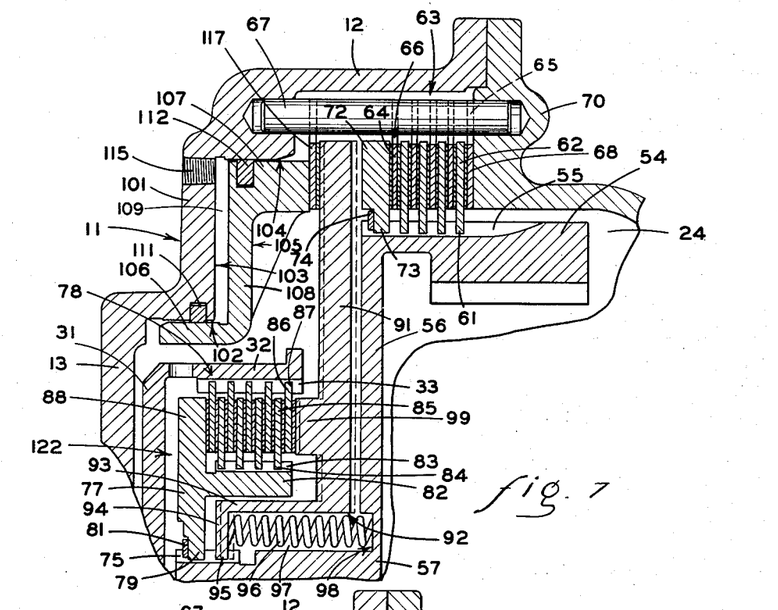
Figure 7 is an enlarged, fragmentary view of Figure 2 showing parts thereof in a different operating position.

The hollow shaft 20 is provided with a radially disposed flange 31 (Figures 2 and 7) between the ends thereof which, in this particular embodiment, is integral with said hollow shaft and disposed adjacent to, but spaced from, the input end wall 13. A cylinder 32, having internal splines 33, is secured to, and extends rightwardly from, the periphery of the flange 31 so that it is approximately co-extensive with, and co-axially encircles, the rightward end of the hollow shaft 20, said cylinder 32 being disposed approximately midway between said hollow shaft 20 and the peripheral wall 12 of said casing 11.

An output shaft 35 (Figure 2) is co-axially and rotatably supported within the shaft opening 16 and the collar 18 by means of the bearing 36, and extends rightwardly from the casing 11. A substantially conventional shaft seal 37, supported within the rightward end of the collar 18, embraces the output shaft 35 adjacent to the bearing 36. The leftward end of the output shaft 35 is provided with a radially extending, integral plate 38, which is disposed within the chamber 24 between, and spaced from, the sun gear 27 and the output end wall 14. Said plate 38 (Figure 6) has portions thereof which extend radially beyond the periphery of the sun gear 27 for engagement, as by means of the bolts 39, with the portions 42 (Figure 5) of the planet carrier 41 which are disposed radially outwardly of the sun gear 27. Said planet carrier or support member 41 has an integral hub 43 which extends leftwardly therefrom to a point near, but spaced from, the radial flange 31 on the hollow shaft 20. Said hub 43 co-axially encircles the rightward end of the hollow shaft 20 and is rotatably supported thereon by means of the bearings 44. Thus, the planet carrier 41 is rotatably supported with respect to both the casing 11 and the sun gear 27 by means of the bearings 36 and 44.

A plurality, here three, hollow planet shafts 45 (Figures 2, 5 and 6) are removably disposed within shaft openings 46 and 47 in the outer portions of the planet carrier 41 and plate 38, respectively. A planet gear 48 is rotatably supported, as by means of the bearings 49, upon each planet shaft 45. Said planet gears 48 and shafts 45 are so arranged that the teeth on the planet gears 48 will be in continuous and proper engagement with the teeth on the sun gear 27. Accordingly, rotation of the sun gear 27 with respect to the planet carrier 41 will effect a rotation of the planet gears 48 about their respective axes in a substantially conventional manner. The planet shafts 45 are here retained within the shaft openings 46 and 47 by means of bars 51 (Figure 6) which extend across the ends of the shafts 45 and are supported upon the planet carrier 41 and the plate 38 by any convenient means, such as the bolts 52. An internally toothed ring gear 54 (Figure 2) co-axially encircles the sun gear 27 and is of such size that its teeth operably engage the teeth on the planet gears 48. The periphery of said ring gear 54 is provided with splines 55 for reasons appearing hereinafter. The ring gear 54 has a radially inwardly extending plate 56 with a central opening which encircles the hub 43, said side plate being disposed adjacent to, but spaced from, the leftward side of the planet carrier 41. The side plate 56 is provided with an integral, leftwardly extending hub 57 which is spaced from, and encircles, the hub 43 on the planet carrier 41. The hub 57, hence the ring gear 54, is rotatably supported upon the hub 43 by means of the bearings 58. Said hub 57 extends to a point adjacent to, but spaced from, the radial flange 31 on the hollow shaft 20.

Figure 5:
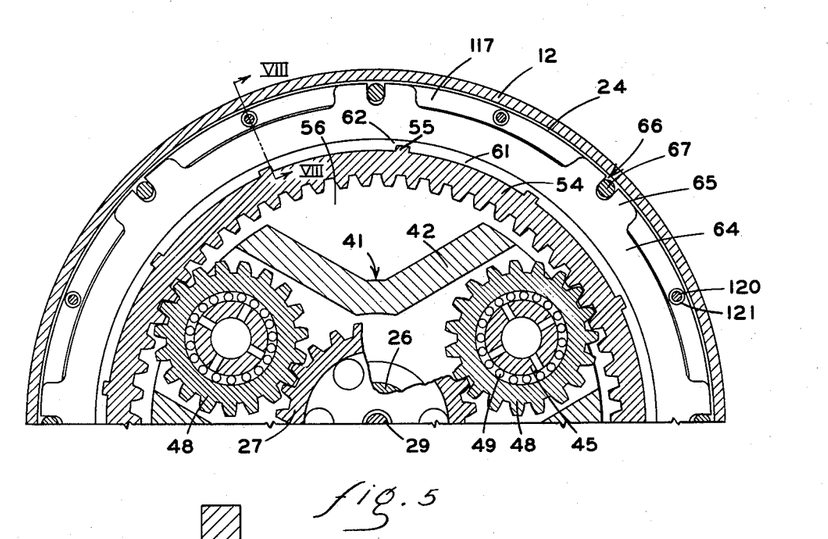
Figure 5 is a sectional view taken along the line V—V of Figure 2.
Figure 6:
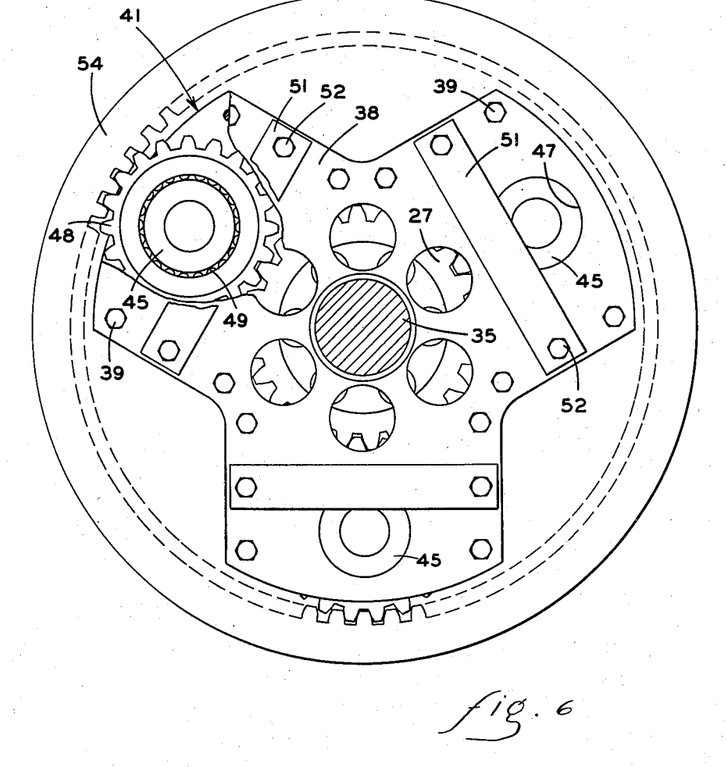
Figure 6 is a sectional view taken along the line VI—VI of Figure 2.

As shown in Figures 2 and 5, the splines 55 of the ring gear 54 are engaged by the inwardly extending teeth 61 on the movable plates 62 of a ratio drive plate type brake mechanism 63. Said brake mechanism 63 has fixed plates 64, which encircle the ring gear 54 and are interleaved with the movable plates in a conventional manner. Said fixed plates 64 are provided with a plurality, here eight, of uniformly spaced lugs 65 which extend radially therefrom beyond the peripheries of the movable plates 62. Each lug has a notch 66 in its outer edge into which a rod 67 is respectively received. The rods 67 are each anchored at both ends within the casing 11 near the peripheral wall 12 thereof, and are disposed axially parallel with each other as well as with the axis of the sun gear 27. Thus, rotation of the ring gear 54 within the casing 11 will effect a corresponding movement of the movable plates 62 with respect to the fixed plates 64 in a substantially conventional manner.

The output end wall 14 has a portion 70, adjacent to the peripheral wall 12, which is offset leftwardly toward said plates 62 and 64. A circular end ring 68, encircles the ring gear 54 between said plates and the offset portion 70. A preferably identical end ring 117 (Figure 3) is located at the other end of the brake assembly. Said end ring 68 which has an inside diameter substantially the same as the inside diameter of the fixed plates 64, and has a periphery which extends about as far out as the lugs 65, is provided with notches 69 (Figure 4) through which the rods 67 can extend. A pressure ring 72 encircles the ring gear 54 on the leftward side of the plates 62 and 64 and has teeth 73 (Figure 7) extending inwardly from its inner edge and slidably engageable with the splines 55 on said ring gear 54. A lock ring 74 is received into an annular groove in the periphery of the ring gear 54 on the leftward side of the pressure ring 72. Thus, the plates 62 and 64 and the end ring 68 are axially slidably disposed upon, and with respect to, the ring gear 54 between the lock ring 74 and the offset portion 70 of the output end wall 14. Accordingly, since the ring gear 54 is axially slidable with respect to the planet gears 48, and since the hub 57, which is attached to said ring gear 54, is axially slidable with respect to the hub 43, which supports it, engagement of the ratio drive brake mechanism 63 can be effected by a rightward movement of the ring gear 54, or of the side plate 56 or hub 57 attached thereto, such movement effecting a compression of the plates 62 and 64 between the pressure ring 72 and the offset portion 70 of the casing 11.

The outer surface of the ring gear hub 57 (Figures 2 and 3) has splines 75 near the leftward end thereof. A flat ring 77, which is a part of the direct drive clutch mechanism 78, encircles the splined leftward portion of the hub 57 and has teeth 79 extending inwardly from its inner edge for engagement with the splines 75 near their leftward ends. A lock ring 81, which is received into an appropriate annular groove in the spline portion of said hub 57 near its leftward edge, limits the leftward movement of the flat ring 77. Said ring 77 extends toward, and is spaced inwardly from, the splined, inner surface of the cylinder 32, which is supported upon the hollow shaft 20.

A co-axial, cylindrical flange 82 (Figure 2) is integral with, and extends rightwardly from, the flat ring 77 between the inner and outer, radial edges thereof. The outer surface of the flange 82 is provided with splines 83 which are axially slidably engaged by the teeth 84 extending inwardly from the driven clutch plates 85 of the direct drive clutch mechanism 78. Said driven clutch plates 85 are interleaved with the driving clutch plates 86 which have teeth 87 along their periphery axially slidably engageable with the splines 33 on the inner surface of the cylinder 32. The radially outer portion 88 of the flat ring 77 limits the leftward movement of the clutch plates 85 and 86 with respect to the hub 57 acting through the lock ring 81. Thus, said flat ring 77 also limits the leftward movement of the clutch plates 85 and 86 with respect to the ring 54, to which the hub 57 is attached, as aforesaid.

A circular plate 91 (Figures 2 and 4) having a central opening 92 encircles the hub 57 between the cylinder 32 supported on the hollow shaft 20 and the side plate 56 on the ring gear 54. Said circular plate 91 has substantially the same peripheral diameter as the pressure ring 72 and is provided with a cylindrical, integral hub 93 which extends leftwardly from said plate 91 adjacent to the central opening 92 and is telescoped within the flange 82. The leftward end of the hub 93 has a radially inwardly extending, integral flange 94 disposed near to, but spaced from, the flat ring 77. The inner edge of the flange 94 is provided with inwardly extending teeth 95 which are snugly, but axially slidably, engageable with the splines 75 on the hub 57.

Figure 3:
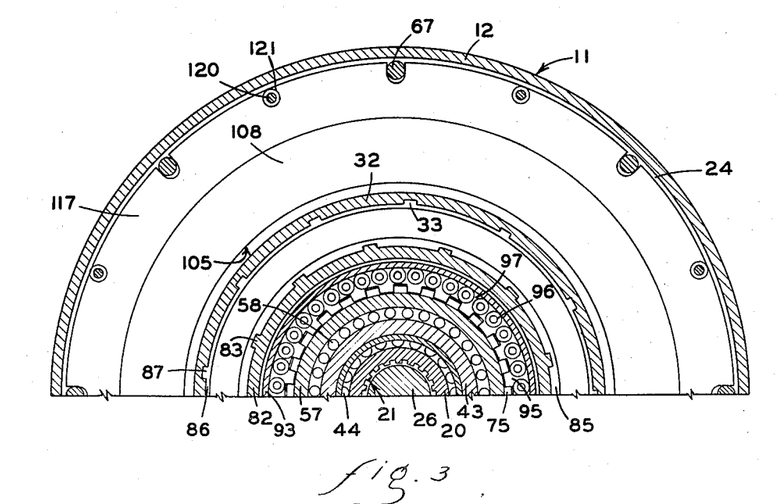
Figure 3 is a sectional view taken along the line III—III of Figure 2.
Figure 4:
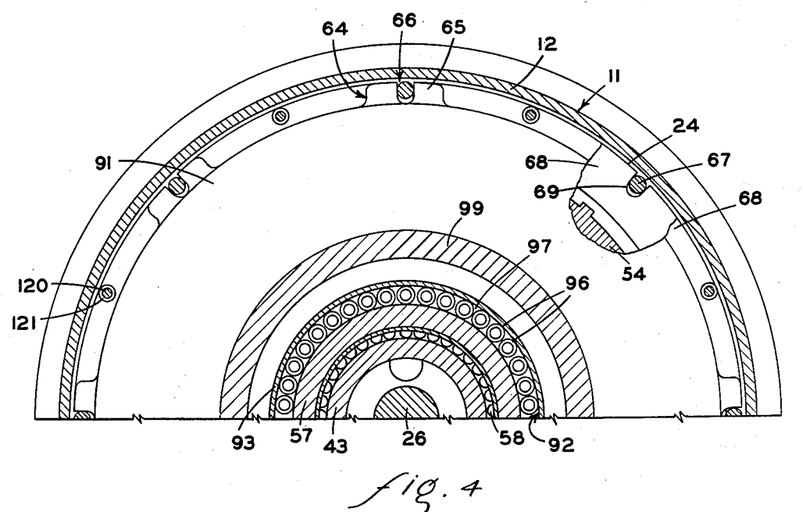
Figure 4 is a sectional view taken along the line IV—IV of Figure 2.

As shown in Figures 2, 3 and 4, a plurality of spiral springs 96, whose axes are substantially parallel with the axis of the sun gear 27, are disposed within the annular space 97 defined by the outer surface of the hub 57 and the inner surface of the cylindrical hub 93. The rightward ends of the springs 96 are received into an annular groove 98 in the leftward face of the side plate 56 adjacent to the hub 57, said groove forming a continuation of the space 97, and the leftward ends of the springs bear against the flange 94. The spacing of the parts is such that the spiral springs 96 are held under compression between the side plate 56 and the inward flange 94.

Said circular plate 91 has a co-axial, annular boss 99 which extends from the leftward face thereof, and is axially aligned with, and engageable with the rightward one of the clutch plates 85 and 86. Thus, since the flange 94 is connected to the annular boss 99 through the hub 93 and circular plate 91, and since the outer portion 88 of the flat ring 77 is connected to the side plate 56, as stated above, the compressed spiral springs 96 cause the clutch plates 85 and 86 to be held tightly between said annular boss 99 and said outer portion 88 of the flat ring 77, thereby resisting any relative rotational movement between the hollow shaft 20 and the ring gear 54.

The input end wall 13 (Figures 2 and 7) has, near its outer edge, a rightwardly offset portion 101 defined by the axially aligned slide wall 102, the radially aligned pressure wall 103, which extends radially outwardly from the rightward end of the wall 102, and the axially aligned slide wall 104 which extends rightwardly from the outer end of the pressure wall 103. The slide walls 102 and 104 and the pressure wall 103 are all disposed within the chamber 24. An annular, actuating member 105 has an inner cylindrical portion 106, which slidably and snugly embraces the slide wall 102, and an outer cylindrical portion 107, which slidably and snugly embraces the slide wall 104. The leftward edge of the outer cylindrical portion 107 is connected to the rightward end of the inner cylindrical portion 106 by a radially aligned piston portion 108 which is preferably integral with said cylindrical portions of the member 105. The respectively opposing surfaces of the walls 103 and 104 and of the portions 108 and 106 combine to provide a radially elongated, annular space 109 constituting the expansible chamber of a pressure device. Conventional sealing means are provided at 111 between the inner slide wall 102 and the cylindrical portion 106, and at 112 between the outer slide wall 104 and the cylindrical portion 107, for resisting escape of pressure fluid, such as compressed air, from within the annular space 109. An inlet conduit 113 and outlet conduit 114 communicate with the annular space 109 through appropriate openings 115 and 116, respectively, through the pressure wall 103. An end ring 117, which may be substantially identical with the end ring 68, is engageable by and disposed between the opposing surfaces of the outer cylindrical portion 107 of the actuating member 105 and the circular plate 91.

Figure 8:
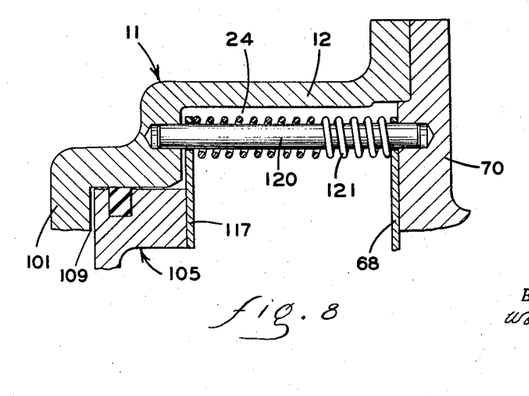
Figure 8 is a sectional view taken along the line VIII—VIII of Figure 5.

As shown in Figure 5, a guide rod 120 is disposed parallel with, and preferably midway between, each pair of adjacent rods 67 and spaced radially outwardly of the plates 62 and 64, the pressure ring 72 and the circular plate 91. As shown in Figure 8, each guide rod extends through appropriate openings in the end rings 68 and 117 near the radially outer edges thereof. The ends of each rod 120 are fixedly seated in the offset portions 70 and 101 of the casing 11 near the peripheral wall 12 thereof. Each said guide rod 120 is encircled with a spiral spring 121 held under compression between the end rings 68 and 117. Thus, the actuating member 105, against which said ring 117 bears, is continuously urged by the springs 121 leftwardly against the offset portion 101, where is remains until pressure fluid is urged into the annular space 109.

Figure 9:
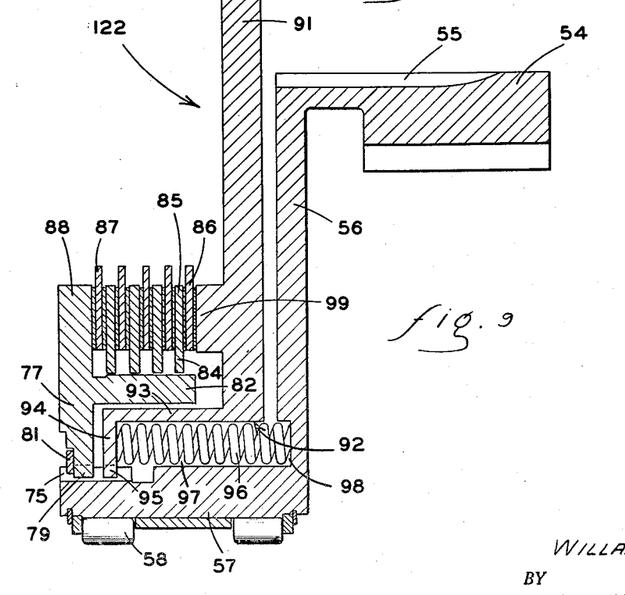
Figure 9 is an enlarged fragment of Figure 2 illustrating the shift unit of said transmission.

That portion of the variable speed transmission 10 (Figures 2 and 9), which includes the flat ring 77, the direct drive clutch mechanism 78, the ring gear 54, the circular plate 91 and parts positively connected to these elements, is hereinafter referred to as the floating shift unit 122 (Figure 9). When there is no material pressure in the annular chamber 109, the entire shift unit 122 will, due to the engagement of the clutch mechanism 78, rotate with the sun gear 27. Further, due to axial alignment of the bearings and gear teeth, said unit 122 will be movable slightly in an axial direction. Introduction of pressure fluid into the annular space 109 from any convenient source, not shown, will cause the actuating member 105 to move from its Figure 2 position to its solid line position in Figure 7 and thence into its broken line position (Figure 7) with result which will be discussed in detail hereinafter.

Figure 10:
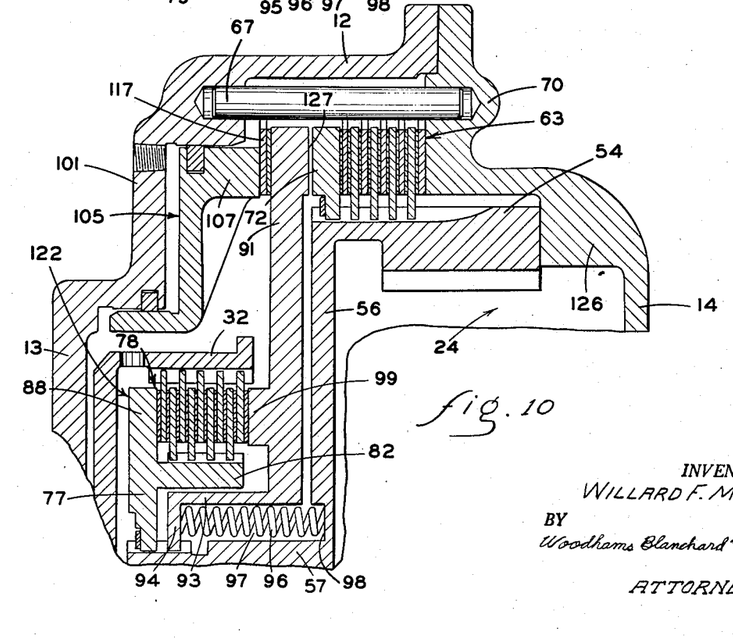
Figure 10 is an enlarged fragment of Figure 2 showing an alternate structure thereof.

The structure of Figure 2 may be modified, as shown in Figure 10 and for purposes appearing hereinafter, by providing an annular boss 126 which extends leftwardly from the output end wall 14 into the chamber 24 to a point adjacent to, and circumferentially slidably engageable with, the rightward face of the ring gear 54. Accordingly, the ratio drive brake mechanism 63 will not be engaged in this embodiment by rightward movement of the ring gear 54 acting through the pressure ring 72. Instead, the circular plate 91 is provided with a rightwardly extending annular ridge 127 near the periphery thereof which is engageable with the pressure ring 72. Said ridge 127 is of such extent as to effect full engagement of the brake mechanism 63 before said circular plate 91 can engage the side plate 56.

Operation

In considering the operation of the apparatus here involved, it will be borne in mind that the speed relationships between the input shaft and the output shaft are relative. Thus, the operation will be the same, or at least substantially the same, if the input shaft increases its speed with the output shaft remaining constant, or the input shaft remains constant with the output shaft decreasing speed or if the change in speed is a combination of changes in speed of both the input and the output shafts. Likewise, the reverse situation is true. Therefore, the following selected specific speed change sequence shall be understood as taken solely for the purposes of illustrating the operation of the apparatus and in no way imparts any limitation into the scope and adaptability of the invention.

Under normal circumstances, the input shaft 25 may, and usually will, be connected either directly or indirectly to a torque producing device of any convenient type, and the output shaft 35 may, and usually will, be coupled with some mechanism which it is desired to rotate or otherwise operate although the input and output ends of the device may be interchanged without altering the invention.

When there is no pressure within the annular space 109 urging the actuating member 105 rightwardly, the transmission is in this embodiment in its direct drive condition. In this condition the spiral springs 121 (Figure 8) will urge said actuating member 105 into its leftward or retracted position where it cannot cause the shift unit 122 to impose any appreciable pressure upon the plates in the ratio drive brake mechanism 63. Thus, the ratio drive brake mechanism 63 will be disengaged. However, due to the action of the spiral springs 96, which are continuously under substantial compression, the direct drive clutch mechanism 78 will be fully engaged. Accordingly, rotation of the input shaft 25 will not only effect a rotation of the sun gear 27, but, operating through said engaged, direct drive clutch mechanism 78 and the shift mechanism 122, will also effect a rotation of the ring gear 54 at the same rotational speed as the sun gear 27. Thus, there will be no rotation of the planet gears 48 about their own axes. Accordingly, the planet carrier 41 and the output shaft 35 secured thereto, will rotate at the same rate as the sun gear 27 and thereby produce a direct drive of the output shaft 35 through the variable transmission 10 from the input shaft 25.

When it becomes desirable to change the speed and torque of the output shaft 35 with respect to that of the input shaft, such change being here taken as a reduction of speed in the output shaft for illustrative purposes only, pressure fluid is introduced in any desired manner through the inlet conduit 113 into the annular space 109. This causes the actuating member 105 to move rightwardly, and thereby effects a compression of the spiral springs 121 until the outer cylindrical portion 107 of the actuating member 105 causes the end ring 117 to engage the leftward surface of the circular plate 91. Assuming that the input shaft 25 is rotating, the circular plate 91 will be rotating therewith as stated above. Thus, there will be a sliding contact between the end ring 117 and the circular plate 91. However, because the end ring 117 is held against rotation by its engagement with the rods 67, neither the end ring 117 nor the actuating member 105 will rotate with respect to the casing 11.

Bearing in mind that the shift unit 122 is able to slide as a unit in a direction parallel with the axis of the input and output shafts, and that said unit 122 includes the circular plate 91, the springs 96 and the side plate 56, it will be recognized that rightward pressure applied to the circular plate 91 will be transmitted through the springs 96 and side plate 56 to urge the ring gear 54 rightwardly. This acts through the pressure ring 72 to urge the plates 62 and 64 of the ratio drive brake mechanism 63 rightwardly and thereby commence engagement of said ratio drive brake mechanism 63. Therefore, as the circular plate 91 is urged rightwardly by the rightward pressure thereon of the end ring 117, the shift unit 122 will move bodily rightwardly and commence the engagement of the ratio drive brake mechanism 63. However, since nothing at this point has occurred to release the direct drive clutch mechanism 78, said clutch mechanism 78 will continue to remain in engagement in response to the urging of the spiral springs 96. Accordingly, there will be a momentary slippage between the clutch plates of the ratio drive brake mechanism 63 inasmuch as at this point they are not yet sufficiently tightly engaged to overcome the more effective engagement between the clutch plates of the direct drive clutch mechanism 78.

As the pressure in the annular chamber 109 continues to increase and the plates of the ratio drive brake mechanism 63 provide resistance against further rightward movement of the side plate 56, the rightward pressure on the circular plate 91 will commence to effect compression of the springs 96 and thereby effect separation of the plates of the direct drive clutch 78. The springs 96 being merely force-transmitting members between the circular plate 91 and the side plate 56, regardless of the extent of their compression, the force applied to the ratio drive brake mechanism 63 will be substantially equal to the force applied to the end ring 117, hence to the shift unit 122, by the actuating member 105 and will increase in direct proportion to the increase in pressure within the chamber 109. However, the springs 96, in opposing the release of the direct drive clutch mechanism 78, insure that pressure remains on the plates of said clutch mechanism 78 during the build up of pressure within the annular chamber 109 and the consequent build up of pressure on the plates of the ratio drive brake 63. Thus, the springs 96 will permit full release of the direct drive clutch mechanism 78 only when the total force applied to the circular plate 91 is in excess of the total force applied to said clutch mechanism 78 by the springs 96.

In view of this, it will be recognized that the pressure on the ratio drive brake 63 will rapidly increase in direct proportion to the increase in pressure developed within the annular space 109 and the pressure on the direct drive clutch 78 will decrease in like proportion. For an appreciable period of time during the shifting operation both the clutch mechanism and the brake mechanism will be at least partially engaged. However, the transition from the domination of the clutch mechanism to the domination of the brake mechanism or vice versa will be instantaneous and without any time lag therebetween.

As soon as the direct drive clutch mechanism 78 is released, the shift unit 122 will be permitted to slow down in its rotational speed with respect to the hollow shaft 20 and will thereby permit the ratio drive brake mechanism 63 to become fully engaged. This causes the ring gear 54 and remainder of the shift unit 122 to come to a complete stop and said ring gear is thereupon held relatively stationary with respect to the casing 11.

During the period in which the rotational speed of the ring gear 54 is being reduced with respect to the rotational speed of the sun gear 27, the planet gears 48 will start rotating about their own axes and will progressively increase such rotation. This, in the well known manner of planetary systems, causes the planet carrier 41, and hence the output shaft 35, to rotate at a speed less than the rotational speed of the input shaft. When the ring gear is fully stopped, the rotational speed of the planet gears will be at a maximum and the rotational speed of the output shaft 35 will be at its minimum. The ratio between the input and output speeds will follow conventional practice.

As long as the pressure is maintained within the annular space 109 (Figure 2) at a value sufficient to compress the spiral springs 96 so that the direct drive clutch mechanism 78 remains disengaged and the ratio drive brake mechanism 63 remains engaged, the transmission 10 will remain in its ratio drive speed condition. However, when it becomes desirable to return the transmission 10 to the direct drive condition, such is easily and quickly accomplished simply by releasing the pressure within the annular space 109. As the pressure in annular space 109 decreases, the spiral springs 96 will be permitted again to engage the direct drive clutch mechanism 78, and the pressure imposed by the shift unit 122 upon the ratio drive brake mechanism 63 will be released, thereby permitting disengagement of the ratio drive brake mechanism 63. Accordingly, the direct drive clutch mechanism 78 will again rotate the shift unit 122 at the same rotational speed as the sun gear 27, and the planet carrier 41, hence the output shaft 35, will again be rotated at the same rotational speed as the input shaft 25.

It will be seen that the only sliding action which will occur within the transmission 10 during a complete shifting cycle, other than the normal slippage which occurs between the clutch plates, is the action which occurs between the end ring 117 and the adjacent face of the circular plate 91. Such sliding action will occur for such an extremely short period of time during the operation of the apparatus that the wear resulting therefrom has no material effect upon the life of the transmission.

It will also be recognized that the time interval during which the direct drive brake 78 and the ratio drive clutch 63 are simultaneously urged into engagement is so extremely short, in actual practice of the order of a small fraction of a second, that this opposing action of said clutch and said brake will not create any unreasonable wear problems. Rather, such additional wear, if any, is of such minor nature that it may as a practical matter be ignored and the only appreciable result of the momentary simultaneous engagement of the clutch and the brake is to insure that there is no appreciable time interval between such engagements and that, therefore, there is no point in the shifting procedure at which the transmission of power through the system is interrupted. This overlapping of the engaged positions of the clutch and the brake is inherent in the structure of the mechanism and will not depend upon the adjustment of any of the parts of the transmission nor upon the timing of any external operating devices.

Where the alternate structure of Figure 10 is utilized, rightward movement of the ring gear 54 is positively limited by the boss 126. Accordingly, rightward movement of the actuating member 105 by pressure fluid within the annular space 109 first acts through the shift unit 122 to move the ring gear against the boss 126. Continued pressure in the space 109 compresses the springs 96, thereby releasing the direct drive clutch mechanism 78, after which still further compression of the springs 96 permits the annular ridge 127 to engage the pressure ring 72, thereby engaging the ratio drive brake mechanism 63. Thus, it will be seen that, in this particular embodiment, the direct drive clutch mechanism 78 is fully released before the ratio drive brake mechanism 63 is engaged. In this embodiment, the pressure required to effect full engagement of the ratio drive brake 63 is in addition to the force required to compress the springs 96 for releasing the direct drive clutch 78. Accordingly, a greater amount of pressure is required in the annular space 109 to effect a shift of the transmission shown in Figure 10 than in the annular space 109 of the transmission shown in Figure 2, whereby the springs 96 are part of the linkage effecting engagement of the ratio drive brake mechanism 63.

The structure illustrated in Figure 10 may be advantageous under circumstances where it is desirable to have the direct drive clutch mechanism 78 fully disengaged before the ratio drive brake mechanism 63 is engaged. Particularly, since the disengagement of the direct drive clutch mechanism 78 and engagement of the ratio drive brake mechanism 63 are completely separate in time, there may be a slight reduction in wearing upon the plates thereof. Also, the boss 126 provides surface, in addition to that between the actuating member 105 and the circular plate 91, whereby the rotational speed of the shift unit 122 is slowed down during the shifting operation. On the other hand, by eliminating the overlapping between the periods of engagement of the brake 63 and clutch 78, the modification shown in Figure 10 eliminates one of the primary objectives of the present invention. Nevertheless, even with the advantageous results of the overlapping engagements of said clutch and brake eliminated, the structure remaining, and as shown in Figure 10, still has several advantages in ease of fabrication, smoothness and economy of operation and ease of maintenance which still makes it an advantageous device.

Various other modifications of the invention above described will be apparent to persons acquainted with devices of this general type in the light of the foregoing disclosure. Thus, although particular, preferred embodiments of the invention have been disclosed hereinabove in detail for illustrative purposes, it will be understood that variations or modifications thereof, which lie within the scope of such disclosure, are fully contemplated unless specifically stated to the contrary in the appended claims.

I claim:

1. In a transmission assembly including a first, input shaft, a second, output shaft coaxial with said first shaft, means connected to said second shaft for effecting rotation thereof in response to rotation of said first shaft and reaction means engaged with said last-named means and adapted to determine the speed of rotation of said second shaft with respect to said first shaft, the improvement in mechanism for the operation of said reaction means comprising in combination: a casing; a clutch within said casing having first and second mutually cooperative parts and means connecting said first part to said first shaft for rotation therewith; a brake within said casing having first brake means stationarily mounted with respect to said shafts and having second brake means continuously drivingly connected to said reaction means; a floating shift unit coaxial with said shafts and movable axially as a unit with respect thereto, said shift unit including first, second and third members; said second cooperative part of said clutch being drivingly connected to said first member, said second member supporting and being drivingly connected to said first member and also supporting said reaction means, said third member being adapted to cause engagement of said clutch and said brake and being axially movable with respect to said second member between a first position wherein said clutch is engaged and a second position wherein said brake is engaged; resilient means between said second and said third members for normally holding said third member in one of said positions such that said brake and said clutch are in opposite conditions of engagement; force responsive means for moving said third member from said one to the other of said positions whereby the conditions of engagement of said clutch and said brake may be reversed.

2. The device defined in claim 1 wherein said third member is also supported on and for rotation with said second member and said resilient means is positioned between said second and third members.

3. The device defined in claim 1 wherein said casing has a first, axially extending surface, a second annular radially extending surface, and an axially extending third surface spaced radially inward from said first surface and parallel therewith; an annular piston member slidably engaging said first and third surfaces and having a fourth surface aligned substantially parallel with said second surface, and means on said piston member for engaging said third member for urging same from said one to the other of said positions upon the movement of said second and fourth surfaces away from each other, and means introducing pressure fluid between said second and fourth surfaces.

4. In a planetary transmission assembly, including a first shaft and a sun gear rotatable therewith, a second shaft co-axial with said first shaft and a planetary system including a support member and a plurality of planetary gears mounted rotatably thereon, said system being rotatable with said second shaft and in operative engagement with said sun gear and a ring gear meshed with said planet gears, the improvement in mechanism for the operation of said ring gear, comprising in combination: frame structure; a direct drive clutch having a first member extending radially from said first shaft and rotatable therewith and having a flange extending axially from the outer end of said first member, said first member having first clutch means on the radially inward side of said flange providing a first frictional direct drive clutch surface; ring gear support means including an axially extending portion and a radially extending portion arranged concentric with, and for rotation about, said first shaft and supporting said ring gear at its radially outer edge; second clutch means providing a second frictional direct drive clutch surface and means supporting same on and for rotation with the axially extending portion of said ring gear support means, said second frictional clutch surface being opposed to said first frictional clutch surface, one of said clutch means being axially movable with respect to the other of said clutch means to make and break clutching contact therebetween; a clutch actuating member having a radially extending portion arranged adjacent said clutch and having a portion thereof in engagement with the movable one of said clutch means, said actuating member being mounted on, rotatable with and axially movable with respect to, the axially extending portion of said ring gear support means; resilient means arranged between said ring gear support means and said actuating member for normally urging said actuating member toward said direct drive clutch means and thereby urging said direct drive clutch surfaces into frictional engagement with each other; a ratio drive brake surrounding said ring gear and having first brake means providing a frictional engaging surface supported on and for rotation with said ring gear and axially movable with respect thereto, said ratio drive brake also having second brake means providing a frictionally engageable surface engageable with that of said first brake means, said second brake means being mounted on and axially movable with respect to said frame structure but being held against rotation thereby; an abutment on said frame structure limiting axial movement of said second brake means and other means transferring movement from said actuating member to said first and second brake means for moving same into frictional engagement with each other; fluid pressure responsive means for applying an axially directed force onto said actuating member and urging same away from contact with the first and second clutch means of said direct drive clutch and into engagement with said first and second brake means of said ratio drive brake, whereby upon application of said force, said direct drive clutch means are released from frictional engagement with each other and said ratio drive brake means are urged into frictional engagement with each other and, upon release of said force, said resilient means will actuate said actuating member to release the ratio drive brake means from frictional engagement with each other and to return the direct drive clutch means into frictional engagement with each other.

5. The device defined in claim 4 wherein said ring gear supporting means is axially slidable in response also to force transmitted thereto through said resilient means from said actuating member and said abutment is spaced axially from said first and second clutch means such a distance that said first and second brake means, in response to force applied thereto by said actuating means, become frictionally engaged before said clutch is released.

6. The device defined in claim 4 including an abutment limiting axial movement of said ring gear in response to pressure of said resilient means and means on said actuating member for effecting contact, upon movement of said actuating member toward said ring gear support means, between said actuating member and one of said first and second brake means for moving same into frictional engagement before contact occurs between said actuating member and said ring gear supporting means, whereby said direct drive clutch will be released upon energizing of said force responsive means prior to the engagement of said brake.

7. In an apparatus for selectively coupling an input and an output shaft to obtain different speed ratios therebetween and having driving means connected to said output shaft for driving said output shaft, a clutch and brake system for driving said driving means from said input shaft, comprising: rotatable reaction means engaged with said driving means and being adapted to cause said driving means to be driven at different speeds with respect to said input shaft; a clutch having opposed friction elements which are clampable together, means drivingly connecting one of said friction elements to said input shaft and supporting said one friction element for axial movement with respect thereto; means supporting the other friction element for rotation and axial movement with respect to said input shaft and drivingly connecting said other friction element to said reaction means; clamping means engageable with said friction elements and movable with respect thereto and with respect to said input shaft to clamp and thereby frictionally engage said elements; means supporting said clutch and the clamping means therefor for axial shifting movement as a unit with respect to said input shaft; a brake having opposed friction elements which are clampable together, one of the friction elements of said brake being stationary; means supporting the other friction element of said brake for axial movement and for rotation with respect to the input shaft and continuously drivingly connecting same to said reaction means; means, including the clamping means for said first clutch, for clamping the friction elements of said brake to thereby frictionally engage the friction elements thereof, said brake when engaged preventing said reaction means from rotation and, when disengaged, permitting said reaction means to rotate; means urging said clutch and said brake into opposite conditions of engagement; and fluid pressure operated means engagable with the clamping means for said clutch for axially shifting said clutch and said clamping means therefor and thereafter reversing the condition of engagement of said clutch and said brake.

8. In an apparatus for selectively coupling an input and an output shaft to obtain different speed ratios therebetween and having driving means connected to said output shaft for driving said output shaft, a clutch and brake system for driving said driving means from said input shaft, comprising: rotatable reaction means engaged with said driving means and being adapted to cause said driving means to be driven at different speeds with respect to said input shaft; a clutch having first clutch means drivingly connected to said input shaft and second clutch means rotatable with respect to said input shaft; axially movable clutch and brake operating means for engaging said first and second clutch means; means drivingly connecting said second clutch means to said reaction means; means supporting said clutch and said operating means for axial shifting movement as a unit with respect to said input shaft; a brake having first brake means stationarily mounted with respect to said input and output shafts, said brake having second brake means continuously drivingly connected to said reaction means and movable axially with respect thereto; fluid pressure operated means engageable with said clutch and brake operating means for moving said clutch and brake operating means away from said clutch whereby said clutch is disengaged; means responsive to such movement of said clutch and brake operating means for engaging said brake means whereby said reaction means are prevented from rotating; said means drivingly connecting said second clutch means to said reaction means including means shiftable axially with respect to said shafts and with respect to said second clutch means a slight distance, said last last-named means extending substantially parallel with said clutch and brake operating means; and springs extending between said last-named means and said clutch and brake operating means for urging said first and second clutch means into engagement.

9. In a planetary transmission assembly including a first shaft and a sun gear secured thereto and rotatable therewith, a second shaft coaxial with said first shaft and a planetary system including a support member and a plurality of planetary gears mounted rotatably thereon, said support member being secured to said second shaft and said planetary gears being meshed with said sun gear, and a ring gear surrounding and meshed with said planetary gears, the improvement in mechanism for the operation of said ring gear which comprises: a casing; a clutch within said casing and having first and second opposed friction clutch means which are clampable together; means drivingly connecting one of said clutch means to said first shaft; a brake located radially outwardly of said ring gear within said casing and having first brake means stationarily mounted with respect to said shafts and having second brake means continuously drivingly connected to said ring gear; a shift unit coaxial with respect to said shafts, said shift unit including connecting means drivingly connecting the other of said clutch means to said ring gear, said shift unit also including a radially extending, annular plate located between said clutch and said brake and having radially spaced portions adapted to cause engagement of said brake and said clutch, said plate being axially movable with respect to said connecting means between a first terminal position wherein said clutch is engaged and a second terminal position where said brake is engaged; spring means between said connecting means and said plate normally urging said plate into one of its terminal positions; said casing having means defining a cylinder therewith; an axially movable piston within said cylinder and movable in response to fluid pressure therewithin to contact said plate and move it from said one to its other terminal position.

10. An improvement as defined in claim 9 including means supporting said shift unit for axial movement with respect to said shafts.

References Cited in the file of this patent
UNITED STATES PATENTS

| | | |
|---|---|---|
| 2,299,387 | Groll | Oct. 20, 1942 |
| 2,441,543 | Longfield | May 11, 1948 |
| 2,540,965 | Schellinger | Feb. 6, 1951 |
| 2,583,556 | Fleischel | Jan. 29, 1952 |
| 2,631,477 | Ball | Mar. 17, 1953 |

FOREIGN PATENTS

| | | |
|---|---|---|
| 1,072,143 | France | Mar. 10, 1954 |
| 1,097,713 | France | Feb. 23, 1955 |